United States Patent
Ohta

(10) Patent No.: US 7,212,231 B2
(45) Date of Patent: May 1, 2007

(54) PHOTOGRAPHING APPARATUS HAVING VARIABLE IMAGE BLUR CORRECTION CONTROL CHARACTERISTICS FOR STILL PHOTOGRAPHY AND MOTION PICTURE PHOTOGRAPHY

(75) Inventor: Seiya Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 10/014,428

(22) Filed: Dec. 14, 2001

(65) Prior Publication Data

US 2002/0047906 A1    Apr. 25, 2002

(30) Foreign Application Priority Data

Jan. 5, 2001    (JP)    ............................. 2001-000866

(51) Int. Cl.
*H04N 5/228*    (2006.01)

(52) U.S. Cl. ............................ 348/208.3; 348/208.1; 348/208.7

(58) Field of Classification Search ........... 348/208.99, 348/208.1, 208.2, 208.3, 208.4, 208.5, 208.16, 348/220.1, 208.12, 248, 208.7, 208.8, 208.11
See application file for complete search history.

(56) References Cited

U.S. PATENT DOCUMENTS

| | | | | |
|---|---|---|---|---|
| 5,020,890 A | * | 6/1991 | Oshima et al. | ............. 359/554 |
| 5,526,045 A | * | 6/1996 | Oshima et al. | .......... 348/208.5 |
| 5,986,698 A | * | 11/1999 | Nobuoka | ................. 348/208.3 |
| 6,208,810 B1 | * | 3/2001 | Imada | ......................... 396/55 |
| 6,734,901 B1 | * | 5/2004 | Kudo et al. | ............. 348/208.4 |
| 6,809,758 B1 | * | 10/2004 | Jones | .................... 348/208.99 |
| 6,940,542 B2 | * | 9/2005 | Kitazawa et al. | ...... 348/208.99 |

* cited by examiner

*Primary Examiner*—Tuan Ho
*Assistant Examiner*—Chriss S. Yoder
(74) *Attorney, Agent, or Firm*—Fitzpatrick, Cella, Harper & Scinto

(57) ABSTRACT

A photographing apparatus capable of photographing still pictures and motion pictures has an image stabilizing feature arranged so as to achieve an appropriate image stabilization characteristic in response to a photography start switch which is turned on and off, and depending upon whether a still picture is photographed or a motion picture is photographed, thereby achieving the optimum image stabilization characteristic for each photographic mode.

9 Claims, 7 Drawing Sheets

PHOTOGRAPHING APPARATUS HAVING VARIABLE IMAGE BLUR CORRECTION CONTROL CHARACTERISTICS FOR STILL PHOTOGRAPHY AND MOTION PICTURE PHOTOGRAPHY

BACKGROUND OF THE INVENTION

1. Field of the Invention

The present invention relates to an improved photographing apparatus capable of photographing still pictures (still picture photography) and motion pictures (motion picture photography) and having an image stabilizing feature.

2. Description of the Related Art

Cameras recently have been provided with an image stabilizing feature. Image stabilizers which correct for image blur include an electronic image stabilizer, which controls an image output signal, and an optical image stabilizer, which uses a vertical angle variable prism (variangle prism). Both types of image stabilizers can effectively correct for camera shake in accordance with controlled photographic conditions, such as panning or tilting and stationary photography when the camera is attached to a tripod.

Many recent cameras are capable of photographing still pictures and motion pictures, including video cameras capable of photographing still pictures, and digital still cameras capable of photographing motion pictures. Such cameras likely will become increasingly widespread in the future.

Desired image stabilizer features for still picture photography and motion picture photography are not the same, and are in fact somewhat opposite of each other. Accordingly, image stabilization control typically is adapted only for either still picture photography or motion picture photography.

For motion picture photography, traceability, by which a photographer's intentional camera work, such as panning and tilting, can be kept track of, is highly desired in image stabilization, in addition to a camera shake correction.

For this purpose, a frequency response of an image stabilizer system often changes to a high-frequency response so that low-frequency camera shake during camera work such as panning and tilting is not corrected for.

For still picture photography, on the other hand, an image stabilizer preferably makes maximum use of its active range to correct for low-frequency camera shake having a relatively large amplitude in addition to small vibration, thereby achieving a low-frequency response in which subject image blurring can be reduced as much as possible.

Since typical cameras capable of photographing still pictures and motion pictures have an image stabilizing feature adapted only to be operable for either still picture photography or motion picture photography whichever one is mainly featured by the subject cameras; for example, a still picture photographed by a video camera which mainly features motion picture photography leads to image blurring with lower resolution because image stabilization is not fully achieved in a low-frequency region.

On the other hand, for motion picture photography using a digital still camera, which is mainly designed for still picture photography, a high-frequency response is not satisfactorily achieved, thereby less precisely defining the angle of view, so that desired quality pictures are not generated.

SUMMARY OF THE INVENTION

Accordingly, it is an object of the present invention to provide a photographing apparatus capable of making an image stabilization characteristic different for still picture photography and for motion picture photography, thereby effectively achieving image stabilization for each of the photographic modes.

To this end, a photographing apparatus capable of photographing still pictures and motion pictures includes an image stabilization control unit, wherein a lower frequency control characteristic is provided for still picture photography than for motion picture photography.

Preferably, the image stabilization control unit uses a control characteristic which is less responded to panning and tilting for still picture photography than for motion picture photography.

Preferably, the photographing apparatus further includes switches which activate the photographic operation. The image stabilization control unit may change the control characteristic in accordance with the operation of first-stage and second-stage switches and in accordance with the selected photographic mode, still picture photography or motion picture photography.

Further objects, features and advantages of the present invention will become apparent from the following description of the preferred embodiments.

DESCRIPTION OF THE PREFERRED EMBODIMENTS

Figure 1:
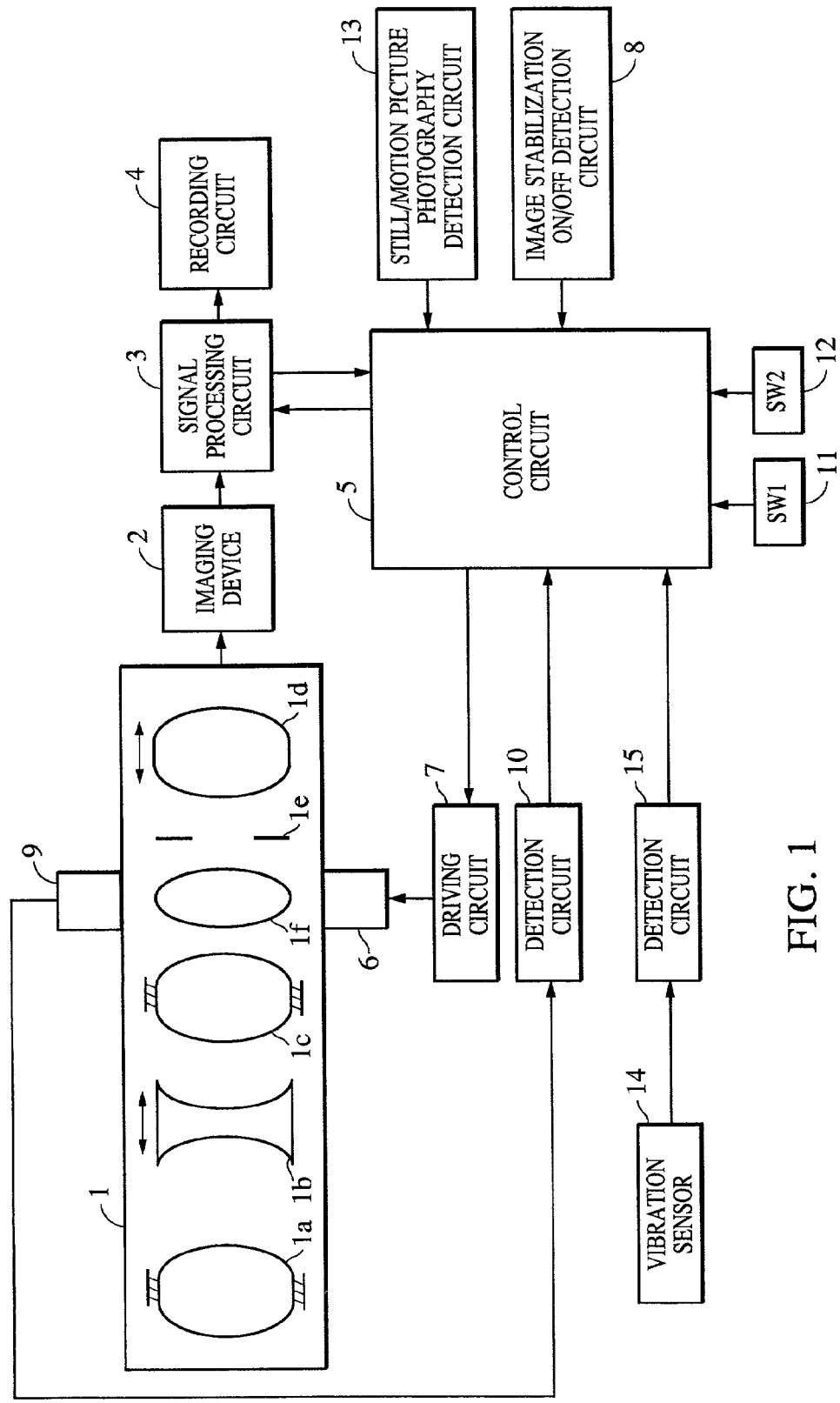
FIG. 1 is a block diagram showing the circuit structure of main components incorporated in a camera according to a first embodiment of the present invention.

The present invention is described in detail in conjunction with embodiments illustrated in the drawings.

First Embodiment

FIG. 1 is a block diagram of the circuit structure of main components incorporated in a camera according to a first embodiment of the present invention.

In FIG. 1, a photographing lens 1 of the rear focusing type includes a front element 1a, a zoom lens 1b, a fixed lens 1c, a focusing lens 1d, an aperture 1e, and an image stabilizer lens 1f comprising a vari-angle prism. The camera further includes an imaging device 2 such as a CCD (charge coupled device), a signal processing circuit 3, a recording circuit 4 for recording still pictures and motion pictures, a control circuit 5 such as a microcomputer, an actuator 6 and a driving circuit 7 which drive the image stabilizer lens 1f, an image stabilization ON/OFF detection circuit 8 for detecting whether an image stabilizing feature is ON or OFF, and a sensor 9 and a detection circuit 10 which detect the position of the image stabilizer lens 1f.

Each of a switch (SW1) 11 and a switch (SW2) 12 is turned on and off in association with operation of a two-stage operation button (not shown) serving as a release unit. When the operation button is released, it is biased by a spring force to return to an original state occupied prior to being depressed, e.g., pressed by a human finger, where the SW1 11 and SW2 12 are off. When the operation button is pressed to the first stage, the SW1 11 is turned on (SW2 still off), and when the operation button is pressed to the second stage, the SW2 12 is turned on (SW1 still on).

Hereinafter, the state where SW1 11 is on is referred to as "generation of signal S1", and the state where SW2 12 is on is referred to as "generation of signal S2." A still/motion picture photography detection circuit 13 for detecting whether still picture photography or motion picture photography is performed includes a switching unit which can switch between a still picture photography mode and a motion picture photography mode using a switch or the like. The camera further includes a vibration sensor 14 for sensing vibration of a vibrating gyroscope, etc., and a detection circuit 15 including a filter and an amplifier which are used to capture the sensor output as a control signal.

For example, if the output of the still/motion picture photography detection circuit 13 indicates still picture photography, in response to generation of signal S1, the focusing position is determined and fixed, and the exposure condition is determined and fixed. Then, in response to generation of signal S2, a still picture is recorded. If the output of the still/motion picture photography detection circuit 13 indicates motion picture photography, a motion picture is recorded in response to generation of signal S2. However, the present invention is not limited thereto; a motion picture may also be recorded by triggering the output of another switch, or the like.

Figure 2:
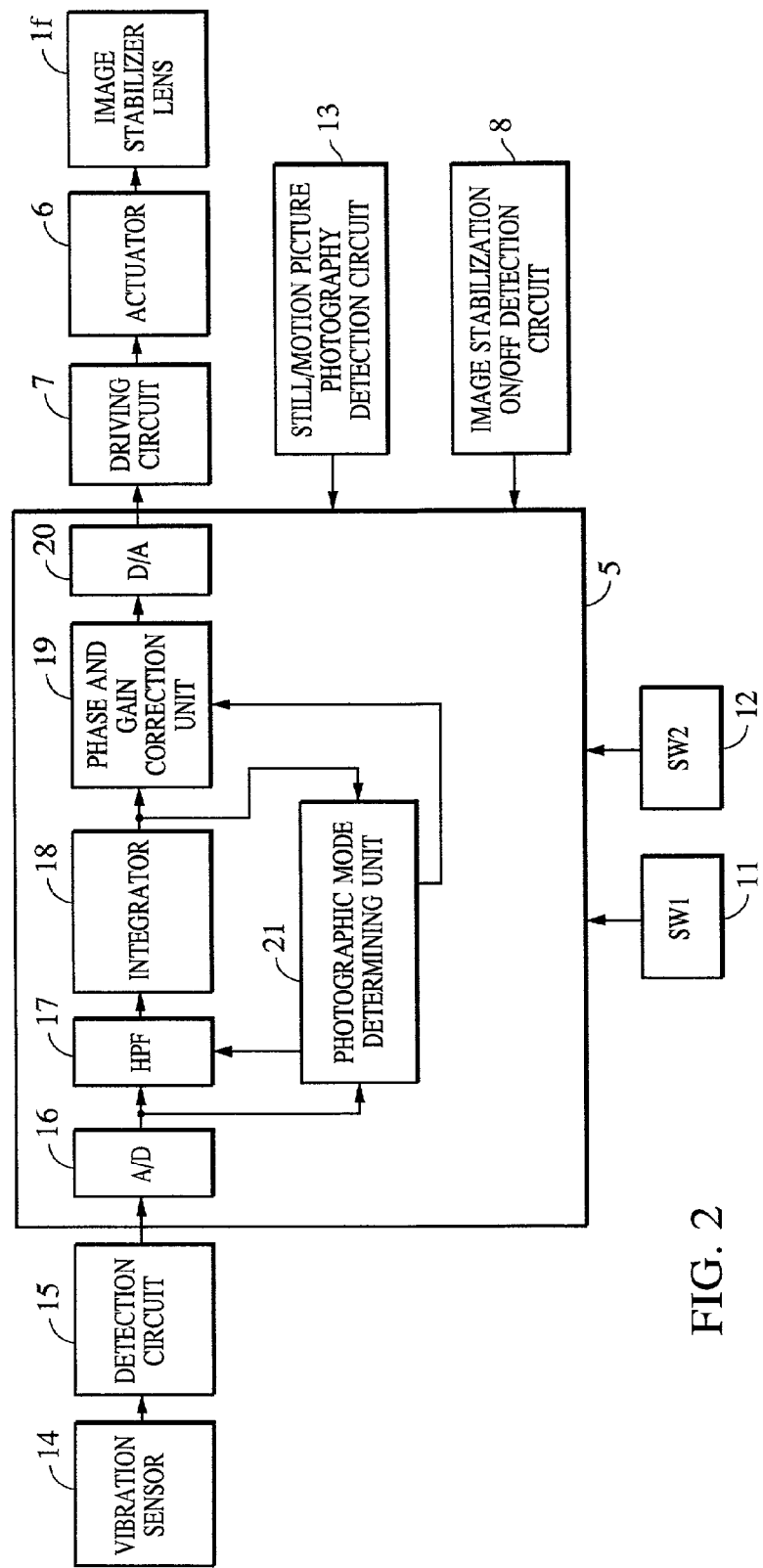
FIG. 2 is a block diagram showing in more detail the control circuit shown in FIG. 1.

FIG. 2 is a block diagram of the internal structure of the control circuit 5 shown in FIG. 1.

The vibration sensor 14 is an angular speed sensor for a gyroscope, or the like, which detects vibration in the horizontal and vertical directions, and the detected vibration signal (angular speed signal) is input to the control circuit 5 via the detection circuit 15. The control circuit 5 digitizes the vibration signal using an analog-to-digital digital (A/D) converter 16, passing the resulting digital signal to a high-pass filter (HPF) 17; the signal then is converted to an angular displacement signal using an integrator 18. The control circuit 5 further performs a phase and gain correction operation on the resulting signal using a phase and gain correction unit 19, and outputs the result to the driving circuit 7 via a digital-to-analog (D/A) converter 20. In response, the image stabilizer lens 1f is driven via the actuator 6 so as to perform image stabilization.

The control circuit 5 further includes a photographic mode determining unit 21. The photographic mode determining unit 21 of control circuits receives the angular speed signal from the vibration sensor 14 (via the detection circuit 15 and the A/D converter 16), the angular displacement signal from the integrator 18, the signals S1 and S2 indicating, respectively, that switch SW1 11 and switch SW2 12 are turned on, and the signal indicative of the output from the still/motion picture photography detector circuit 13. In response, the photographic mode determining unit 21 changes characteristics of the HPF 17 and the phase and gain correction unit 19 in consideration of their outputs so as to be set for a high-frequency response or a low-frequency response.

The photographic mode determining unit 21 may also function to detect a frequency and to obtain the filtering characteristic optimum to that frequency. This function enables a high-frequency response to be more likely provided for motion picture photography, so that traceability may be achieved, that is, the photographer's camera work, such as panning and tilting, can be kept track of, in addition to a camera shake correction. Likewise, for still picture photography, a low-frequency response can be more likely provided in which a low-frequency camera shake having a relatively large amplitude in addition to small vibration is corrected for.

The photographic mode determining unit 21 also may function to detect panning or tilting from the output of the vibration sensor 14 or from the output of the integrator 18 in order to enhance the traceability with respect to panning or tilting. More specifically, once an angular speed signal or an angular displacement signal having a predetermined level or more has been detected, a higher-frequency response is achieved so as to keep track of camera work such as panning and tilting. With a narrow range of detection levels, panning or tilting may be more sensitively detected, and a high-frequency response is more likely provided. With a wide range of detection levels, panning or tilting may be more difficult to detect, and a high-frequency response is less likely provided, as will be anticipated by a person having ordinary skill in the art.

In this case, the detection level for still picture photography and for motion picture photography can be changed such that the detection level range may be made more narrow, so that panning or tilting may be more easily detected, or may be made wider, so that panning or tilting may be more difficult to detect. Accordingly, a high-frequency response is more likely obtained for motion picture photography so that traceability may be achieved, that is, the photographer's intentional camera work, such as panning and tilting, can be kept track of, in addition to a camera shake correction. For still picture photography, an active range of the image stabilizer lens 1f is used to the most possible extent to correct for a low-frequency camera shake having a relatively large amplitude in addition to small vibration, thereby achieving a low-frequency response in which subject image blurring can be reduced as much as possible.

The present invention is directed to a camera capable of photographing both still pictures and motion pictures, which makes an image stabilization characteristic different for still picture photography and for motion picture photography, thereby effectively achieving image stabilization for each photographic mode.

Figure 3:
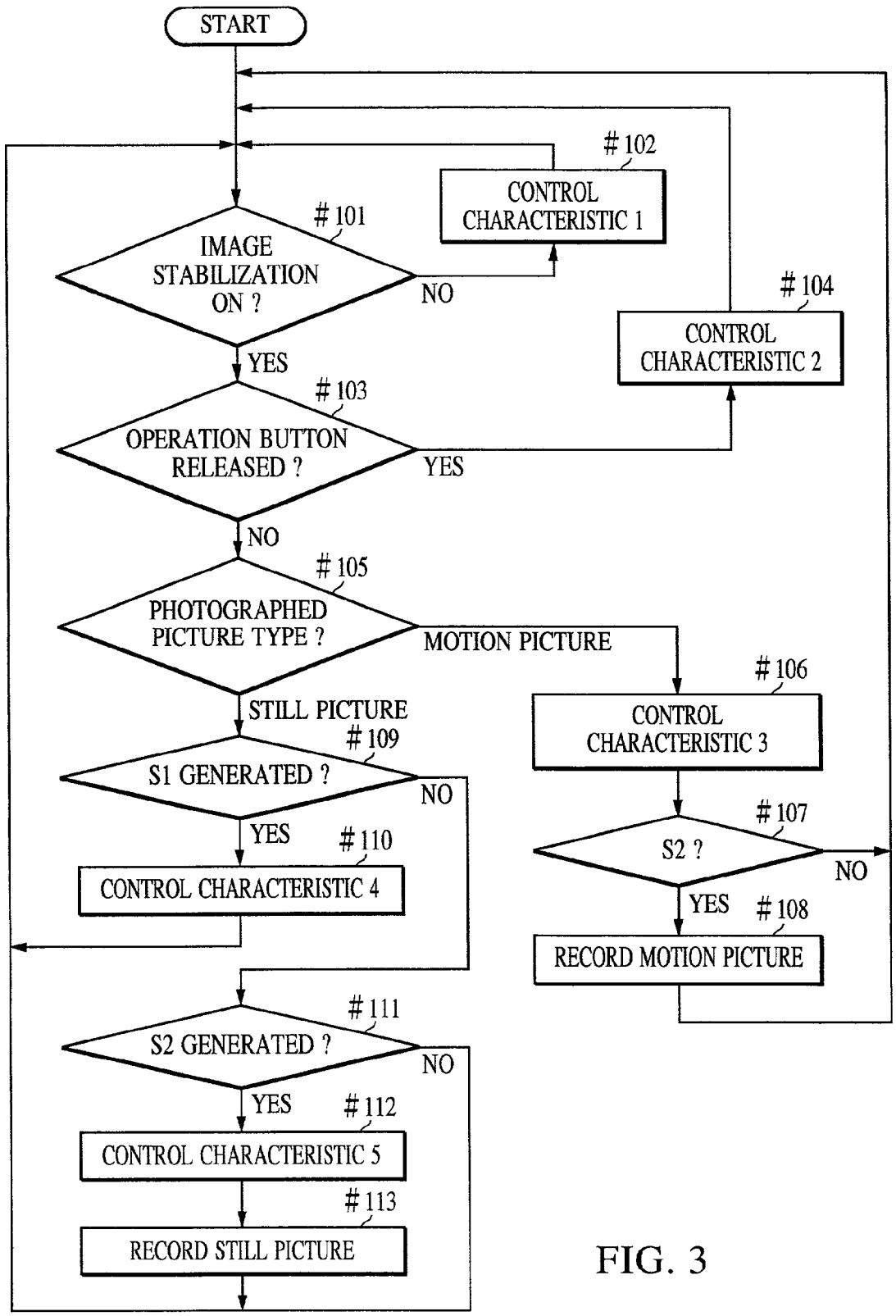
FIG. 3 is a flowchart showing operation of main components incorporated in the camera according to the first embodiment.

The operation of major components in the camera according to the first embodiment is described in conjunction with a flowchart shown in FIG. 3.

At step #101, it is determined from the output of the image stabilization ON/OFF detection circuit 8 whether an image stabilizing feature is on or off. If it is off, the control proceeds to step #102, where a control characteristic 1 is provided. The control characteristic 1 has a characteristic in which an image stabilizer lens 1f is fixed so as not to move and the image stabilizing feature is turned off.

If it is determined at step #101 that the image stabilizing feature is on, the control proceeds to step #103, where it is determined whether or not a two-stage operation button (not shown in FIGS. 1 and 2) is released (where the signals S1 and S2 are not generated). If it is released, the control proceeds to step #104, where a control characteristic 2 is provided. The control characteristic 2 is set so that a relatively high-frequency response is readily achieved to keep close track of variations in angle of view or intentional camera work, such as panning or tilting, thereby providing controls suitable to determine a subject or to precisely define the angle of view for still picture photography and for motion picture photography. In this case, since a still picture or a motion picture is not recorded, there is no need to provide distinct controls for the photographic modes. Therefore, the controls may be the same. The control characteristic 2 may be a characteristic, if desired, in which image stabilization takes fewer advantages or no advantage, or, otherwise, is disabled, or may be the same as the control characteristic 1.

If the two-stage operation button (not shown in FIGS. 1 and 2) is not released, the control proceeds from step #103 to step #105, where it is determined from the output of the still/motion picture photography detection circuit 13 whether a still picture is photographed or a motion picture is photographed. If a motion picture is photographed, the control proceeds to step #106, where a control characteristic 3 is provided. The control characteristic 3 is a control characteristic which more likely provides a relatively high-frequency response so that variations in angle of view or intentional camera work, such as panning or tilting, is closely kept track of, in addition to image stabilization. This may be the same as the control characteristic 2 at step #104. The same characteristic is provided when a motion picture is photographed and when the operation button is released in order that variations in angle of view or intentional camera work, such as panning or tilting, is closely kept track of, in addition to image stabilization. In this case, a higher-frequency response may be provided when a motion picture is photographed than when the operation button is released, thereby making the traceability higher when a motion picture is photographed. Alternatively, a lower-frequency response may be provided when a motion picture is photographed than when the operation button is released, thereby allowing lower-frequency vibration having a relatively larger amplitude to be corrected for when a motion picture is photographed than when the operation button is released. Accordingly, the characteristic can be readily set according to the purpose.

The control proceeds from step #106 to step #107, where it is determined whether or not the signal S2 is generated. If it is generated, the control proceeds to step #108 to record the motion picture in the recording circuit 4, before returning to step #101. If the signal S2 is not generated, the control directly returns to step #101.

If a still picture is photographed at step #105, the control proceeds to step #109, where it is determined whether or not only the signal S1 is generated. Unless only the signal S1 is generated, the control proceeds to step #111. If only the signal S1 is generated, the control proceeds to step #110, where a control characteristic 4 is provided. The control characteristic 4 is a characteristic provided when a still picture is photographed, which more likely provides a relatively low-frequency response, in which an active range of the image stabilizer lens 1f is effectively used to correct for a low-frequency camera shake having a relatively large amplitude, in addition to small vibration. The control characteristic 4 which provides a lower-frequency response than at least the control characteristics 2 and 3, allows a low-frequency camera shake having a relatively large amplitude to be also corrected for. In the first embodiment, a description is made with reference to the flowchart in FIG. 3 in the case where the control characteristic 4 more likely provides a low-frequency response than the control characteristic 2. However, since a still picture has not been actually photographed when the signal S1 is generated, the control characteristic 4 may be the same as the control characteristic 2 where the operation button is released, such that variations in angle of view or intentional camera work, such as panning or tilting, is closely kept track of, in addition to image stabilizing. Since the same control characteristics are provided when the signal S1 is generated and when the operation button is released, the photographer will not feel any difference between when the operation button is released where he/she defines the angle of view for photography and when the signal S1 is generated. Furthermore, since image stabilization is often performed in a smaller angle than when low-frequency vibration is taken into account, and a narrower driving range of the image stabilizer provides an advantage of power saving.

While the signal S1 is generated, a high-frequency response may also be achieved in order to increase the traceability compared to when the operation button is released. This is effective to precisely define the angle of view when pictures are photographed with a camera moving, such as during panning.

Accordingly, the control characteristic 2 may have an appropriate characteristic for this purpose.

Returning to the flowchart in FIG. 3, after step #109, the control returns to step #101. On the other hand, when the control proceeds to from step #109 step #111, it is determined whether the signal S2 is also generated. If it is not generated, the control returns to step #101. If the signal S2 is also generated, the control proceeds to step #112, where a control characteristic 5 is provided. The control characteristic 5 may be the same as the control characteristic 4. The control characteristic 5 is not particularly limited to a low-frequency response, and may more likely provide a high-frequency response depending upon the structure and specification of that camera in order to overcome problems involved therewith. Any of the control characteristics has a variable control to accommodate the application, feature, specification, structure, etc., of the subject products. The present invention can be applied to various kinds of usage such that the control characteristic data, which is stored in a rewritable storage circuit, is used to readily change the performance of a product. The above-noted control characteristics are only illustrative, and may be possibly the same depending upon photographic modes or conditions. The same control characteristic will not be limited to the above-noted types of control characteristics.

Second Embodiment

A second embodiment of the present invention is intended to photograph pictures when a camera is fixed and stationary without being vibrated, such as when the camera is mounted/installed, or the camera is attached to a tripod. In this case, in order to prevent image blur caused by variations in low-frequency D.C. signal output, which are converted into vibration signals to activate the image stabilizer lens 1f, a stationary decision is performed in which, once a camera has been detected as stationary, the image stabilizer lens 1f is driven at a high frequency region so as to prevent image blurring. As control characteristics are made different for still picture photography and for motion picture photography, as in the first embodiment, conditions for the stationary decision also vary. Thus, the stationary decision has a variable characteristic depending upon the control characteristics.

A camera according to the second embodiment has the same circuit structure as that shown in FIGS. 1 and 2.

The photographic mode determining unit 21 in the control circuit 5 has a function to determine the stationary state of the camera based on the output of the vibration sensor 14. For example, when a vibration frequency is not detected for a predetermined time, the camera is determined as stationary.

For still picture photography, pictures are often photographed with the camera being fixed, even when it is held by hand, and the stationary state may be more difficult to detect than for motion picture photography, where panning and tilting are more frequently performed. This is because, when the camera is held by hand, the camera is more possibly detected as stationary by mistake than when motion pictures are photographed. For this purpose, the time during which the frequency cannot be detected for a predetermined time may be longer for still picture photography than for motion picture photography, by way of example.

A decision of stationary state by detecting the frequency is described. The frequency is detected by counting the number of times at which the output of the angular speed signal from the vibration sensor 14 or the output of the angular displacement signal from the integrator 18 exceeds a predetermined output level for a predetermined time. For example, if a camera shake is caused when a picture is photographed with a camera held by hand, a camera-shake frequency can be found based on the above-described angular speed signal and angular displacement signal. Since the photographic mode determining unit 21 can change the control characteristic according to the detected frequency, the characteristic is set so as to detect only a frequency of the signal output having an amplitude to some extent for still picture photography by increasing detection level of the frequency compared to for motion picture photography so that a high-frequency response is less likely provided for still picture photography than for motion picture photography. Therefore, the stationary decision using that frequency would be different in level from the stationary decision for motion picture photography. In some cases, the stationary decision may be immediately performed, thereby adversely affecting the control. When the stationary decision is performed using the output of the frequency, the camera is determined to be stationary if the frequency is not detected for a predetermined time. The predetermined time or the detection level of the frequency for still picture photography is different from that for motion picture photography, thereby preventing the camera from being incorrectly determined as stationary. In addition, an appropriate setting for each of the photographic modes enables the control characteristic for still picture photography and for motion picture photography to change, so that the stationary decision of the camera can be correctly performed.

A stationary state can be detected by changing the decision level of various signals. Such signals include not only the aforementioned frequency but also an angular speed signal, an angular displacement signal, a panning or tilting time, a predetermined counter, and the like. A combination of these signals may be used for the decision.

For illustration, when a stationary state is determined using an angular speed signal and an angular displacement signal, the camera is determined as stationary unless the angular speed signal and the angular displacement signal reach a predetermined level. In this case, desirably, the signal level and the predetermined time for the decision are different for still picture photography and for motion picture photography.

Furthermore, for illustration, a stationary state may be determined by detecting whether or not the camera is panning or tilting by detecting whether or not the angular speed signal and the angular displacement signal are continuously output in a constant direction for a particular time. When panning or tilting is detected, the photographic mode determining unit 21 allows the control characteristic to provide a high-frequency response in order to increase the traceability. However, if the control characteristics are different for still picture photography and for motion picture photography, for example, if panning or tilting is more difficult to detect for still picture photography, the control characteristic may less likely provide a high-frequency response. Therefore, in some cases, the stationary decision using a panning or tilting detection would be immediately performed, thereby adversely affecting the control. If the stationary decision is performed using the result of panning or tilting detection, the setting for still picture photography and for motion picture photography may be different, such that the stationary decision is more sensitive to a panning detection for still picture photography than for motion picture photography. Therefore, an appropriate stationary decision can be performed even when a variable control characteristic is provided for still picture photography and for motion picture photography.

Accordingly, as described with respect to the first embodiment, if a variable control characteristic is provided for still picture photography and for motion picture photography and in response to switching for photography, the detection level of the frequency, the panning or tilting detection level, etc., are different, and the stationary decision level may also vary accordingly. Of course, the control characteristic may vary, but the decision level of the stationary decision may be fixed.

According to the second embodiment, a detection characteristic of the stationary state may be different for still picture photography and for motion picture photography, and may depend upon photographic conditions, such as the output of a switch (SW1 and SW2 in this example) for photography, thereby providing a stationary state control suitable for any photographic condition. The detection characteristic of the stationary state may be the same for still picture photography and for motion picture photography, or may be otherwise higher for still picture photography, according to the specification of products or photographic conditions. The present invention is not particularly limited.

Figure 4:
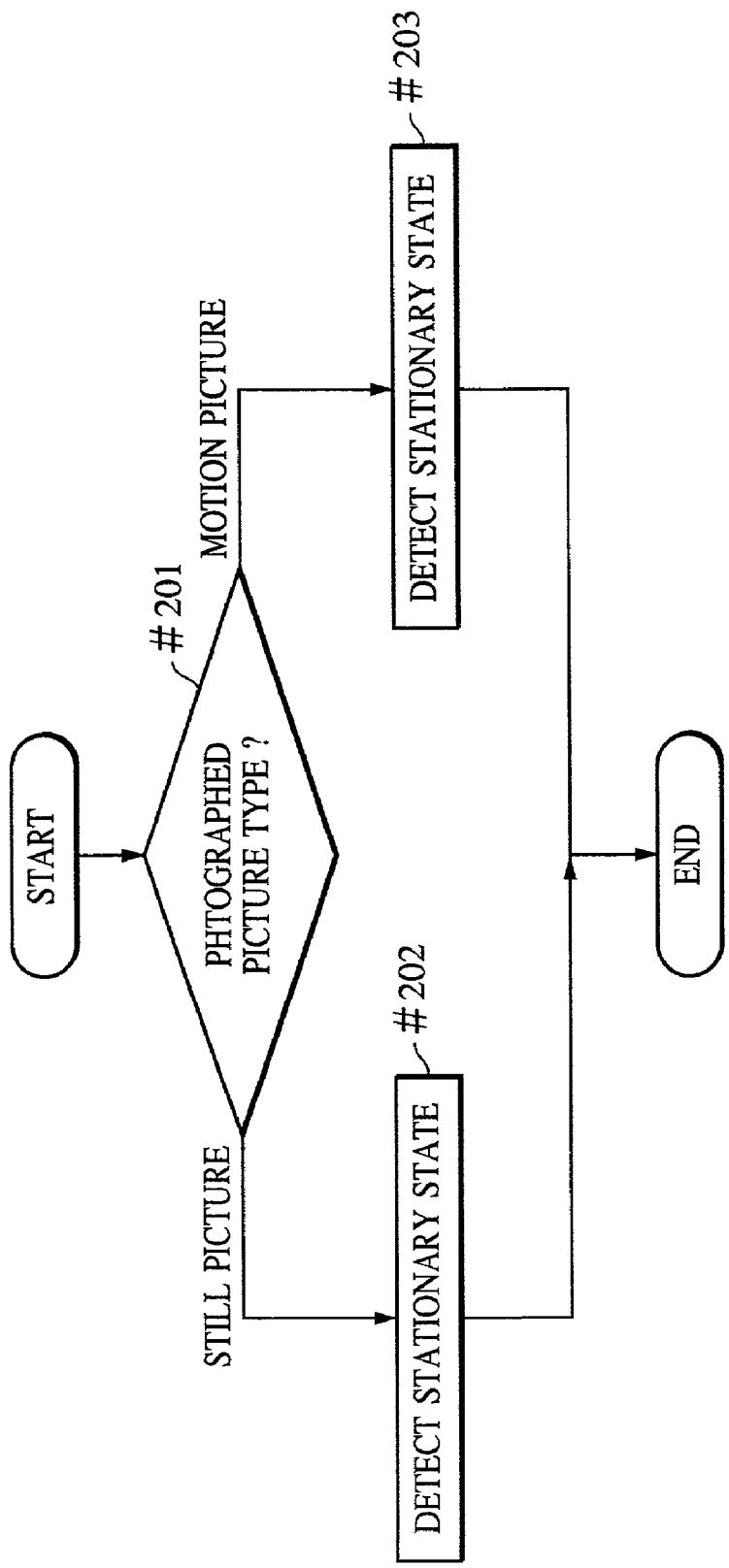
FIG. 4 is a flowchart showing operation of main components incorporated in a camera according to a second embodiment of the present invention.

FIG. 4 is a flowchart schematically showing a stationary decision of a camera according to the second embodiment of the present invention for still picture photography and for motion picture photography.

At step #201, it is determined whether a still picture is photographed or a motion picture is photographed. If a still picture is photographed, the process proceeds to step #202, where a stationary state for still picture photography is detected. If a motion picture is photographed, the process proceeds to step #203, where a stationary state for motion picture photography is detected.

Figure 5:
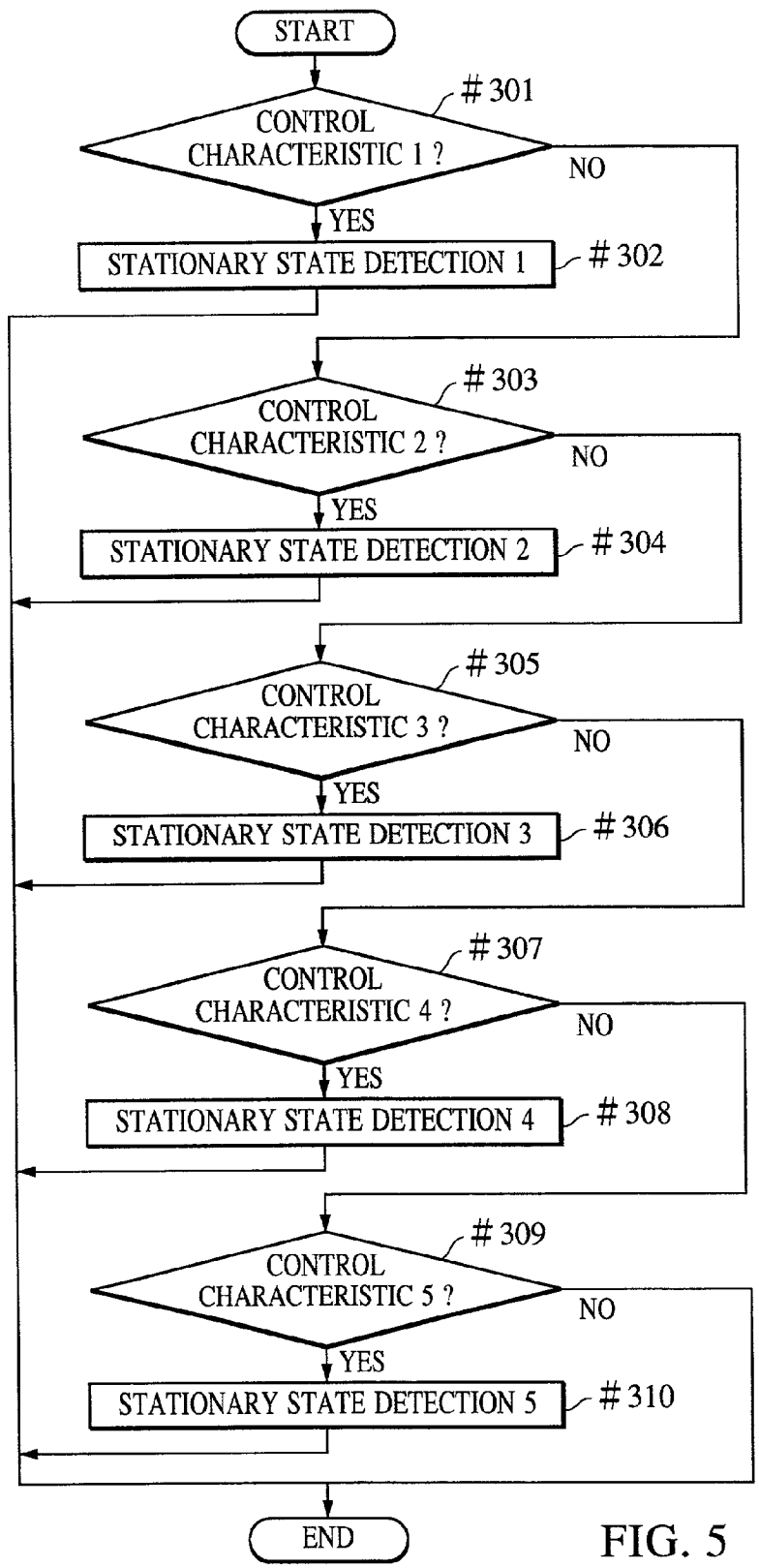
FIG. 5 is a flowchart showing operation of main components incorporated in the camera according to the second embodiment.

FIG. 5 is a flowchart showing a stationary state detection with respect to each of the control characteristics 1 to 5 in the first embodiment.

First, at step #301, it is determined whether or not the control characteristic in question is control characteristic 1. If so, then control proceeds to step #302, where a stationary state detection (stationary state detection 1) suitable for the control characteristic 1 is performed. If the control characteristic in question is not control characteristic 1, then control proceeds from step #301 to step #303, where it is determined whether or not the control characteristic in question is control characteristic 2. If the control characteristic in question is control characteristic 2, then control proceeds to step #304, where a stationary state detection (stationary state detection 2) suitable for control characteristic 2 is performed. If the control characteristic in question is not control characteristic 2, the process proceeds from step #303 to step #305, where it is determined whether or not the control characteristic in question is control characteristic 3. If the control characteristic in question is control characteristic 3, then control proceeds to step #306, where a stationary state detection (stationary state detection 3) suitable for control characteristic 3 is performed.

If the control characteristic in question is not control characteristic 3, then control proceeds from step #305 to step #307, where it is determined whether or not the control characteristic in question is control characteristic 4. If the control characteristic in question is control characteristic 4, then control proceeds to step #308, where a stationary state detection (stationary state detection 4) suitable for control characteristic 4 is performed. If the control characteristic in question is not control characteristic 4, then control proceeds from step #307 to step #309, where it is determined whether or not the control characteristic in question is control characteristic 5. If the control characteristic in question is control characteristic 5, then control proceeds to step #310, where a stationary state detection (stationary state detection 5) suitable for control characteristic 5 is performed, and the control process ends. If the control characteristic in question is not control characteristic 5, then the control process immediately ends.

Third Embodiment

Figure 6:
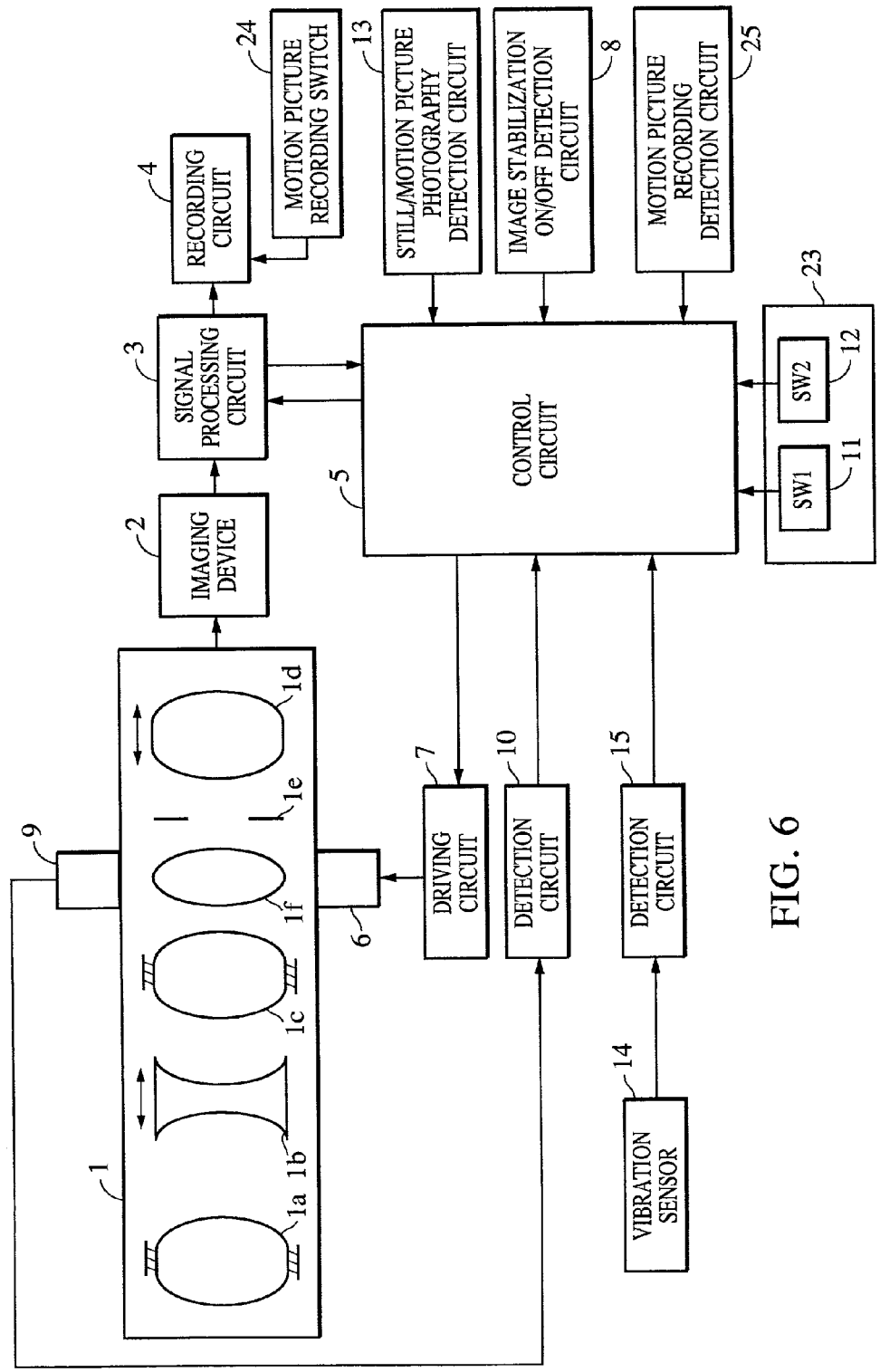
FIG. 6 is a block diagram of the circuit structure of main components incorporated in a camera according to a third embodiment of the present invention.

FIG. 6 is a block diagram of main components of a camera according to a third embodiment of the present invention. The same reference numerals are given to the same components as those in FIG. 1, and the description thereof is thus omitted.

A two-stage operation button including switch SW1 11 and switch SW2 12 is collectively indicated as a photo switch 23. The camera further includes a motion picture recording switch 24, and a motion picture recording detection circuit 25. The motion picture recording switch 24 is used to record motion pictures which are photographed, and is toggled to repeat record and stop operations. As the motion picture recording switch 24 enables recording of motion pictures to start and stop, the motion picture recording detection circuit 25 outputs a signal indicating whether or not a motion picture is being recorded.

According to the third embodiment, the photo switch 23 is used for still picture photography, and the motion picture recording switch 24 is used for motion picture photography, by way of example.

During photography, a user often finds a subject or defines the angle of view while viewing a captured image through a finder (not shown) without the image being recorded. In this case, the user may more greatly move or more roughly handle the camera than not only when still pictures are photographed but also when motion pictures are recorded. Since slight blurring is less clearly identified on the camera finder, the control characteristic may be changed to a control characteristic which more likely provides a high-frequency response than when motion pictures are recorded, thereby increasing the traceability.

Figure 7:
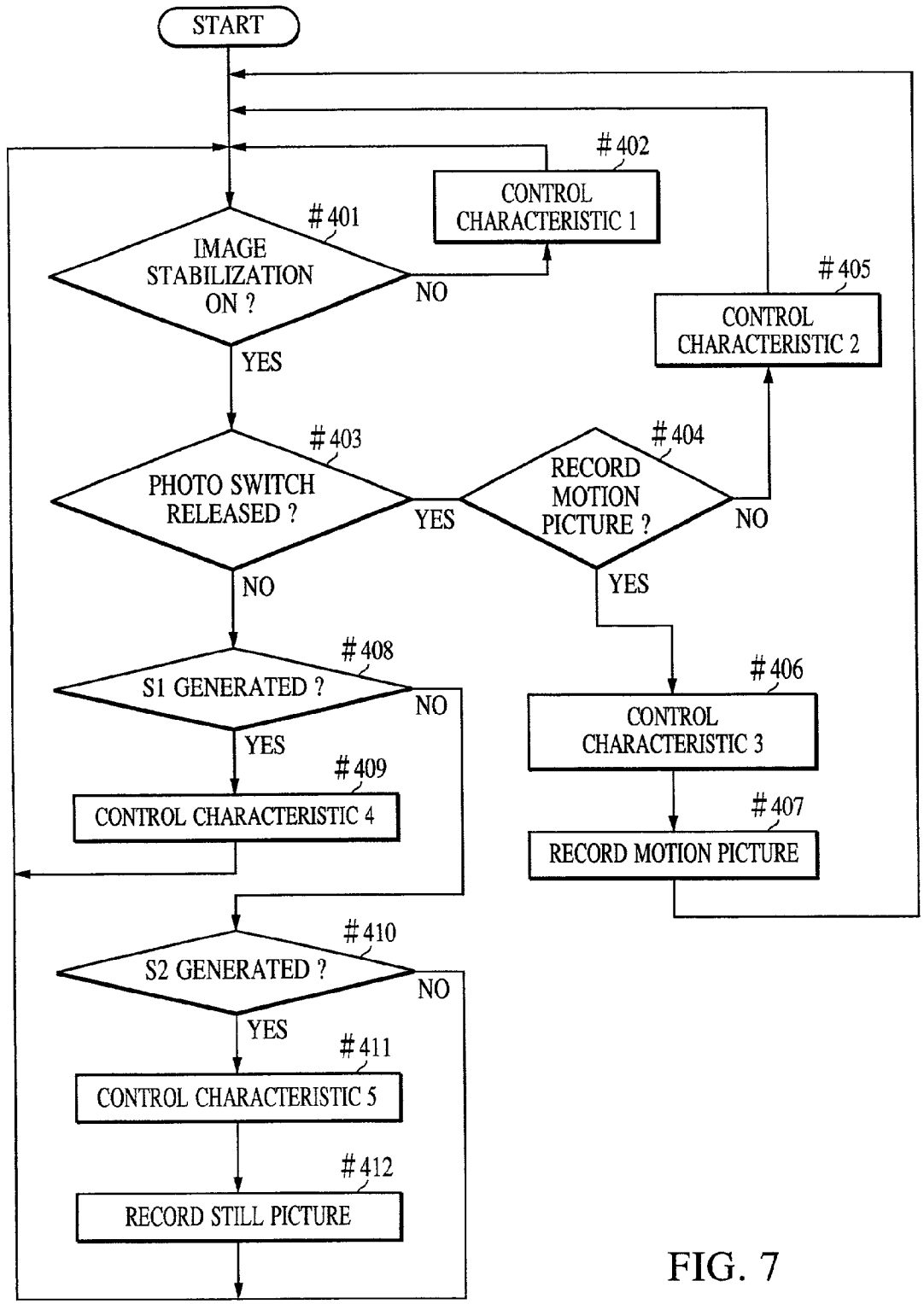
FIG. 7 is a flowchart showing operation of main components incorporated in the camera according to the third embodiment.

FIG. 7 is a flowchart showing the operation of main components in the camera according to the third embodiment.

First, at step #401, it is determined from the output of the image stabilization ON/OFF detection circuit 8 whether an image stabilizing feature is on or off. If this feature is off, the process proceeds to step #402, where a control characteristic 1 is provided. The control characteristic 1 has a characteristic in which the image stabilizer lens 1ƒ is fixed so as not to move and the image stabilization feature is turned off.

If the image stabilization feature is on, the process proceeds from step #401 to step #403, where it is determined whether or not the photo switch 23 is released. If it is released, the process proceeds to step #404, where it is determined from the output from the motion picture recording detection circuit 25 whether or not a motion picture is being recorded. If a motion picture is not being recorded, the process proceeds to step #405, where a control characteristic 2 is provided. The control characteristic 2 has a characteristic which more likely provides a relatively high-frequency response to keep close track of variations in angle of view or intentional camera work, such as panning or tilting, thereby providing controls suitable to determine a subject or to precisely define the angle of view for still picture photography and for motion picture photography. In this case, since a still picture or a motion picture is not recorded, there is no need for distinct controls for the photographic modes. Therefore, the controls may be the same. The control characteristic 2 may be a characteristic, if desired, in which image stabilization takes fewer advantages or no advantage, or, otherwise, is disabled, or may be the same as control characteristic 1.

If it is determined at step #404 that a motion picture is being recorded, the process proceeds to step #406, where a control characteristic 3 is provided. The control characteristic 3 is a control characteristic which more likely provides a relatively high-frequency response so that variations in angle of view or intentional camera work, such as panning or tilting, may be closely kept track of, in addition to image stabilizing. The control characteristic 3 may be the same as control characteristic 2 at step #405, or, otherwise, may be a control characteristic which less likely provides a high-frequency response than control characteristic 2. The process then proceeds to step #407, where a motion picture is recorded, and returns to step #401.

If it is determined at step #403 that the photo switch 23 is pressed, the process proceeds to step #408, where it is determined whether or not only the signal S1 is generated. At this time, even if a motion picture is being recorded, a still picture may also be photographed when the photo switch 23 is operated. If only the signal S1 is generated, the process proceeds to step #409, where a control characteristic 4 is provided. The control characteristic 4 is a characteristic used when a still picture is photographed in response to generation of the signal S1, which more likely provides a relatively low-frequency response, in which an active range of the image stabilizer lens 1ƒ is effectively used to correct for low-frequency camera shake having a relatively large amplitude, in addition to small vibration. The control characteristic 4 may be a control characteristic which more likely provides a low-frequency response than at least control characteristic 2 or 3. Although not shown, if the signal S1 is generated while a motion picture is being recorded, the control characteristic 4 is not limited thereto, and may be a control characteristic used when a motion picture is being recorded.

After control characteristic 4 is provided at step #409, the process returns to step #401. On the other hand, unless it is determined that only the signal S1 is generated at step #408, the process proceeds to step #410, where it is determined whether or not the signal S2 is also generated. If signal S2 is not generated, then the process returns to step #401. If signal S2 is also generated, then the process proceeds to step #411, where a control characteristic 5 is provided. The control characteristic 5 may be the same as control characteristic 4. Alternatively, the control characteristic 5 may be a control characteristic which more likely provides a low-frequency response than control characteristic 4, in which an active range of the image stabilizer lens 1$f$ is effectively used to further correct for low-frequency camera shake having a relatively large amplitude. The control characteristic 5 is not particularly limited on a low-frequency response. If some vibration is caused by a pressing operation in order to generate signal S2, or if there is a capture error due to a shutter time lag, control characteristic 5 may more likely provide a high-frequency response depending upon the structure and specification of that camera in order to overcome problems involved therewith. Any of the control characteristics has a variable control to accommodate the application, feature, specification, structure, etc., of the subject products. The present invention can be applied to various kinds of usage such that the control characteristic data which is stored in a rewritable storage circuit is used to readily change the performance of a product. The above-noted control characteristics are only illustrative, and possibly may be the same, depending upon photographic modes or conditions. The same control characteristic will not be limited to the above-noted control characteristics.

According to the illustrated embodiments, for motion picture photography, a control characteristic of an image stabilizer can be changed so as to more likely provide a high-frequency response in which the photographer's intentional camera work, such as panning or tilting, may be closely kept track of.

For still picture photography, the control characteristic can be changed so as to more likely provide a low-frequency response in which an active range of an image stabilizer lens is used to the greatest possible extent so as to correct for a low-frequency camera shake having a relatively large amplitude, in addition to small vibration, so that any subject image blur can be reduced as much as possible. Therefore, a photographing apparatus capable of photographing still pictures and motion pictures, including a video camera capable of photographing still pictures, and a digital still camera capable of photographing motion pictures, can effectively perform image stabilization depending upon photographic modes, thereby achieving satisfactory photographic operation.

Often, the frequency response of an image stabilizer system changes to a high-frequency response so that a low-frequency camera shake during camera work, such as panning or tilting, is not corrected for.

In order to overcome such an inconvenience, advantageously, for still picture photography, an active range of an image stabilizer is effectively used to the greatest possible extent to correct for a low-frequency camera shake having a relatively large amplitude, in addition to small vibration, thereby achieving a low-frequency response in which any subject image blur can be reduced as much as possible.

Accordingly, a photographing apparatus of the present invention can make a characteristic of an image stabilizer different for still picture photography and for motion picture photography, thereby effectively achieving image stabilization for each photographic mode.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus capable of imaging a still picture and a motion picture, comprising:
    an image stabilizer that suppresses image blur of the imaging apparatus;
    first determination means for determining which one of still picture imaging and a motion picture imaging is performed;
    second determination means for determining whether an image stabilization process is actuated, whether an operation switch is released, whether a first signal is generated in response to operating the operation switch, or whether a second signal is generated in response to operation of the operation switch;
    a controller that selects a control frequency characteristic of said image stabilizer based on the result produced by said first determination means,
    wherein said controller also selects a control frequency characteristic in response to said second determination means determining that the image stabilization function is turned off, that the operation switch is released, that the first signal is generated, and that the second signal is generated, and
    wherein the control frequency characteristic of said image stabilizer has a lower frequency response for still picture imaging than for motion picture imaging.

2. An imaging apparatus according to claim 1, further comprising:
    an imaging switch that activates an imaging operation; and
    a controller that starts controlling the control frequency characteristic of said image stabilizer in response to the operation of said imaging switch.

3. An imaging apparatus according to claim 2, wherein said imaging switch is operated in a plurality of stages, and the control frequency characteristic is selected when a predetermined number of stages of said imaging switch are operated.

4. An imaging apparatus according to claim 2, wherein the same control frequency characteristic is selected regardless of whether said imaging apparatus is performing still picture imaging or motion picture imaging while said imaging switch is not operated.

5. An imaging apparatus according to claim 4, further comprising:
    a panning and tilting detector that detects whether said imaging apparatus is being panned or tilted, using a predetermined detection characteristic selected from among a plurality of detection characteristics, the predetermined detection characteristic being selected on the basis of whether said imaging apparatus is performing still picture imaging or motion picture imaging.

6. An imaging apparatus according to claim 2, further comprising:
a panning and tilting detector that detects whether said imaging apparatus is being panned or tilted, using a predetermined detection characteristic selected from among a plurality of detection characteristics, the predetermined detection characteristic being selected in response to operation of said imaging switch and on the basis of whether said imaging apparatus is performing still picture imaging or motion picture imaging.

7. An imaging apparatus capable of imaging a still picture and a motion picture, comprising:
an image stabilizer that suppresses image blur; and
a detector that detects a vibration frequency using a predetermined vibration detection characteristic selected from among a plurality of vibration detection characteristics,
wherein the predetermined vibration detection characteristic is selected on the basis of whether said imaging apparatus is performing still picture imaging or motion picture imaging,
wherein the predetermined vibration detection characteristic is also selected on the basis of whether an image stabilization function is turned off, whether an operation switch is released, whether a first signal is generated in response to the operation switch not being released, and whether a second signal is generated in response to the operation switch not being released.

8. A photographing apparatus according to any one of claims 1, 2, and 7 to 6, further comprising a detector that detects whether said photographing apparatus is performing still picture photography or motion picture photography.

9. A photographing apparatus according to any one of claims 1, 2, and 7 to 6, further comprising a selector that selects still picture photography or motion picture photography.

* * * * *

UNITED STATES PATENT AND TRADEMARK OFFICE
CERTIFICATE OF CORRECTION

| | |
|---|---|
| PATENT NO. | : 7,212,231 B2 |
| APPLICATION NO. | : 10/014428 |
| DATED | : May 1, 2007 |
| INVENTOR(S) | : Seiya Ohta |

Page 1 of 1

It is certified that error appears in the above-identified patent and that said Letters Patent is hereby corrected as shown below:

<u>COLUMN 6:</u>
Line 32, "to from step #109 step #111" should read --from step #109 to step #111--.

<u>COLUMN 14:</u>
Line 11, "7 to 6" should read --5 to 7--.
Line 15, "7 to 6" should read --5 to 7--.

Signed and Sealed this

Twenty-sixth Day of August, 2008

JON W. DUDAS
*Director of the United States Patent and Trademark Office*